US010075057B2

(12) United States Patent
Shen et al.

(10) Patent No.: US 10,075,057 B2
(45) Date of Patent: Sep. 11, 2018

(54) HYBRID TOPOLOGY POWER CONVERTER AND CONTROL METHOD THEREOF

(71) Applicant: Delta Electronics (Shanghai) Co., Ltd., Shanghai (CN)

(72) Inventors: Dingkun Shen, Shanghai (CN); Jianfei Zheng, Shanghai (CN); Wei Xu, Shanghai (CN); Jianping Ying, Shanghai (CN); Lan Wei, Shanghai (CN); Zhiming Hu, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 14 days.

(21) Appl. No.: 15/497,714

(22) Filed: Apr. 26, 2017

(65) Prior Publication Data
US 2017/0317576 A1    Nov. 2, 2017

(30) Foreign Application Priority Data

Apr. 29, 2016   (CN) .......................... 2016 1 0284392

(51) Int. Cl.
*H02M 1/08* (2006.01)
*H02M 1/14* (2006.01)
(Continued)

(52) U.S. Cl.
CPC ............ *H02M 1/083* (2013.01); *H02M 1/14* (2013.01); *H02M 7/487* (2013.01); *H02M 7/49* (2013.01);
(Continued)

(58) Field of Classification Search
CPC .. H02M 7/7575; H02M 7/53871; H02M 7/48; H02M 7/5395; H02M 7/53873;
(Continued)

(56) References Cited

U.S. PATENT DOCUMENTS 6,005,788 A * 12/1999 Lipo .................. H02M 7/49
363/71
6,882,550 B1 * 4/2005 Baumgart ............. H02M 1/12
323/207
(Continued)

OTHER PUBLICATIONS

Chen Yuanhua, et al., Research of Capacitor Voltage Balance Control Method for H-bridge Inverter of Hybrid 9-Level Inverter, Tsinghua University, Beijing, China, pp. 1714-1719, 2004.
(Continued)

*Primary Examiner* — Jue Zhang
*Assistant Examiner* — Kevin H Sprenger
(74) *Attorney, Agent, or Firm* — Kirton McConkie; Evan R. Witt (57) ABSTRACT

A hybrid topology power converter includes a three-level circuit module and a cascaded H-bridge circuit module. A control method includes the following steps. Firstly, a zero sequence component is injected into a total modulation wave, thereby generating a compensated total modulation wave. Then, a first voltage signal is generated according to the compensated total modulation wave. An H-bridge modulation wave is generated according to the compensated total modulation wave and the first voltage signal. A three-level driving signal is generated according to the first voltage signal, and an H-bridge driving signal is generated according to the H-bridge modulation wave. A duty cycle of at least one switch element of the three-level circuit module is adjusted according to the three-level driving signal. A duty cycle of at least one switch elements of the cascaded H-bridge circuit module is adjusted according to the H-bridge driving signal.

20 Claims, 9 Drawing Sheets

(51) Int. Cl.
*H02M 7/487* (2007.01)
*H02M 7/49* (2007.01)
*H02M 1/00* (2006.01)
*H02M 7/483* (2007.01)

(52) U.S. Cl.
CPC .............. *H02M 2001/0025* (2013.01); *H02M 2007/4835* (2013.01)

(58) Field of Classification Search
CPC .... H02M 7/53875; H02M 7/527; H02M 7/49; H02M 7/483; H02M 7/487; H02M 7/497; H02M 7/06; H02M 7/10; H02M 7/217; H02M 7/219; H02M 7/537; H02M 7/003; H02M 7/5387; H02M 7/53835; H02M 7/5381; H02M 7/53806; H02M 1/12; H02M 1/126; H02M 1/44; H02M 1/4208; H02M 1/4225; H02M 1/14; H02M 1/15; H02M 1/143; H02M 1/4266; H02M 1/06; H02M 1/083; H02M 3/135; H02M 3/137; H02M 3/10; H02M 3/157; H02M 3/1584; H02M 3/33592; H02M 3/33523; H02M 3/3384; H02M 5/4585; H02M 5/458; H02M 5/447; H02M 5/45; H02M 5/4505; H02M 5/005; H02J 9/062; H02J 3/36; H02J 3/01; H02H 7/268
See application file for complete search history.

(56) References Cited

U.S. PATENT DOCUMENTS

| | | | | |
|---|---|---|---|---|
| 9,263,971 | B2* | 2/2016 | Ilic | H02M 7/53873 |
| 2010/0142234 | A1* | 6/2010 | Abolhassani | H02M 5/4585 |
| | | | | 363/41 |
| 2014/0293663 | A1* | 10/2014 | Ledezma | H02M 5/458 |
| | | | | 363/37 |
| 2015/0333612 | A1* | 11/2015 | Hasler | H02M 1/12 |
| | | | | 363/39 |
| 2016/0149507 | A1* | 5/2016 | Lei | H02M 7/487 |
| | | | | 363/35 |
| 2016/0218637 | A1* | 7/2016 | Fan | H02M 7/483 |
| 2017/0163171 | A1* | 6/2017 | Park | H02M 7/537 |
| 2017/0187276 | A1* | 6/2017 | Townsend | H02M 1/084 |
| 2017/0244314 | A1* | 8/2017 | Lee | H02M 5/458 |
| 2017/0288562 | A1* | 10/2017 | Palle | H02M 5/458 |
| 2017/0294853 | A1* | 10/2017 | Flannery | H02J 3/1857 |
| 2018/0145579 | A1* | 5/2018 | Spudic | H02M 1/12 |

OTHER PUBLICATIONS

Chen Yuanhua, et al., PWM and Capacitor Voltage Balance Control Strategies for Hybrid 9-Level Inverter, Tsinghua University, Beijing, China, pp. 3465-3470, 2004.

* cited by examiner

HYBRID TOPOLOGY POWER CONVERTER AND CONTROL METHOD THEREOF

FIELD OF THE INVENTION

The present application relates to a power converter and a control method thereof, and more particularly to a hybrid topology power converter and a control method thereof.

BACKGROUND OF THE INVENTION

Recently, a hybrid topology power converter with a three-level circuit module and a cascaded H-bridge circuit module was developed. The hybrid topology power converter has the topology of a large-power multi-level converter. For designing this hybrid topology power converter such as a static Var generator (SVG) or a high voltage inverter, the ripple voltage and the ripple current of the bus capacitor and the energy loss of the power elements should be taken into consideration.

Some methods of reducing the ripple voltage or the ripple current of the bus capacitor were disclosed. In a conventional method, the capacitance of a bus capacitor is increased or the number of capacitors is increased. Consequently, the bus ripple voltage is reduced, and the ripple current of each capacitor is reduced. However, if the capacitance of the bus capacitor or the number of capacitors is increased, the overall volume and the fabricating cost of the hybrid topology power converter are increased.

Moreover, the energy loss of the power element can be reduced through a soft switch design. However, it is difficult to achieve the soft switch design of the hybrid topology power converter because the soft switch design is complicated, the energy loss reduction is small and the conduction energy loss cannot be effectively reduced.

SUMMARY OF THE INVENTION

An object of the present application provides a hybrid topology power converter and a control method of the hybrid topology power converter in order to overcome the drawbacks of the conventional technologies.

Another object of the present application provides a hybrid topology power converter and a control method of the hybrid topology power converter. A zero sequence component is injected into a total modulation wave. Consequently, the ripple voltage and the ripple current of the bus capacitor of the three-level circuit module and the energy loss of all power elements of the hybrid topology power converter are reduced, and the power density of the hybrid topology power converter is increased. The performance of the hybrid topology power converter is still satisfied. Moreover, since the capacitance of the bus capacitor and the number of capacitors are not increased, the overall volume and the fabricating cost of the hybrid topology power converter are not increased.

In accordance with an aspect of the present application, there is provided a control method of a hybrid topology power converter. The hybrid topology power converter includes a three-level circuit module and a cascaded H-bridge circuit module. An output side of the three-level circuit module is connected with an input side of the cascaded H-bridge circuit module. The control method includes the following steps. Firstly, a zero sequence component is injected into a total modulation wave, thereby generating a compensated total modulation wave. Then, a first voltage signal is generated according to the compensated total modulation wave. An H-bridge modulation wave is generated according to the compensated total modulation wave and the first voltage signal. A three-level driving signal is generated according to the first voltage signal, and an H-bridge driving signal is generated according to the H-bridge modulation wave. A duty cycle of at least one switch element of the three-level circuit module is adjusted according to the three-level driving signal. A duty cycle of at least one switch elements of the cascaded H-bridge circuit module is adjusted according to the H-bridge driving signal.

In accordance with another aspect of the present application, there is provided a hybrid topology power converter. The hybrid topology power converter includes a three-level circuit module, a cascaded H-bridge circuit module and a control unit. An output side of the three-level circuit module is connected with an input side of the cascaded H-bridge circuit module. The control device includes a compensated modulation wave generator, a voltage generator, a modulation wave generator and a pulse generation unit. The compensated modulation wave generator receives a total modulation wave and a zero sequence component and injects the zero sequence component into the total modulation wave, thereby generating a compensated total modulation wave. The voltage generator receives the compensated total modulation wave, and generates a first voltage signal. The modulation wave generator receives the first voltage signal and the compensated total modulation wave, thereby generating an H-bridge modulation wave. The pulse generation unit receives the first voltage signal and the H-bridge modulation wave, and generates a three-level driving signal corresponding to the first voltage signal and an H-bridge driving signal corresponding to the H-bridge modulation wave. The pulse generation unit adjusts a duty cycle of at least one switch element of the three-level circuit module according to the three-level driving signal, and adjusts a duty cycle of at least one switch elements of the cascaded H-bridge circuit module according to the H-bridge driving signal.

The above contents of the present application will become more readily apparent to those ordinarily skilled in the art after reviewing the following detailed description and accompanying drawings, in which:

DETAILED DESCRIPTION OF THE PREFERRED EMBODIMENT

The present application will now be described more specifically with reference to the following embodiments. It is to be noted that the following descriptions of preferred embodiments of this application are presented herein for purpose of illustration and description only. It is not intended to be exhaustive or to be limited to the precise form disclosed.

Figure 1:
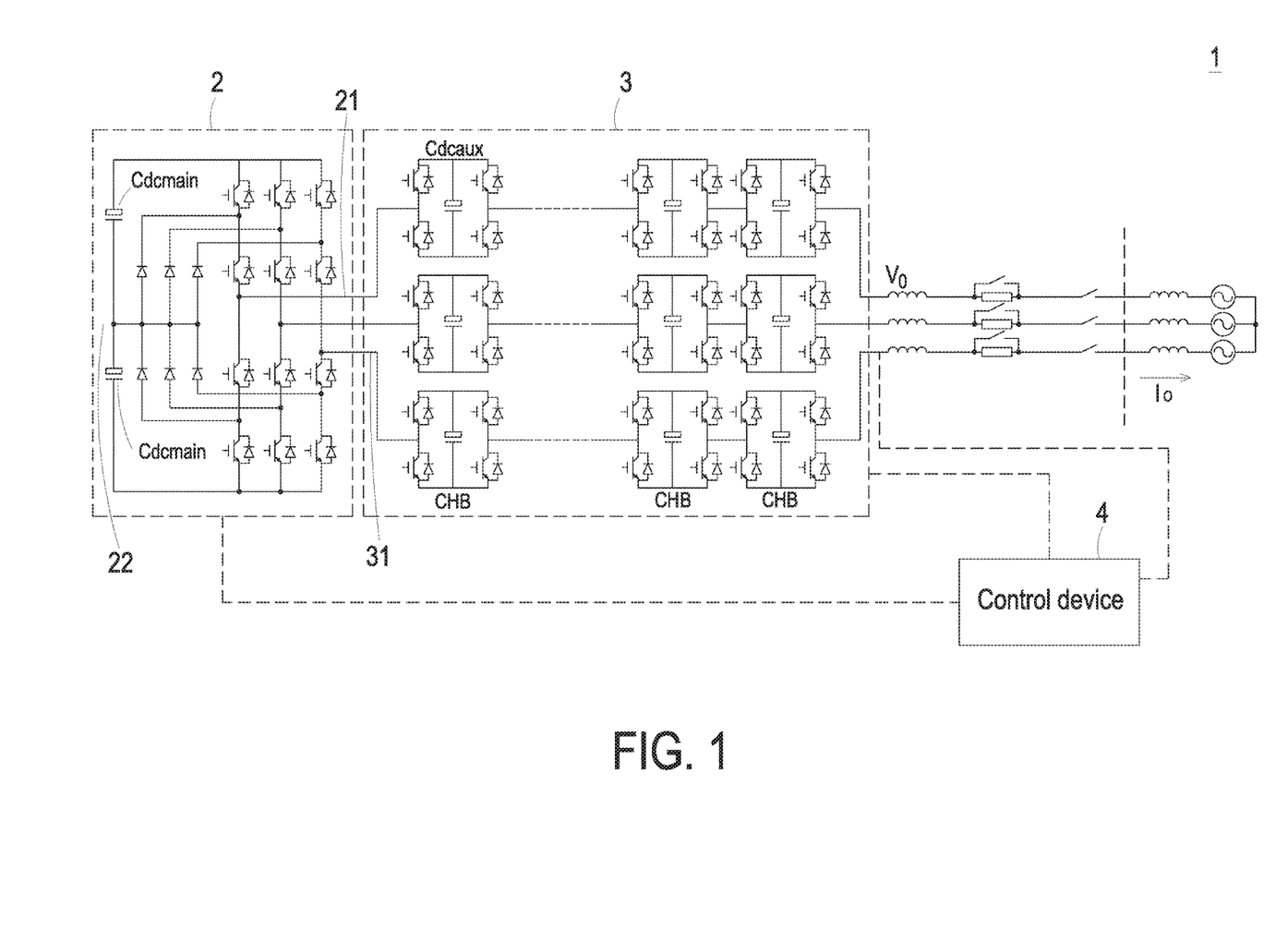
FIG. 1 is a schematic circuit diagram illustrating a hybrid topology power converter according to an embodiment of the present application.

FIG. 1 is a schematic circuit diagram illustrating a hybrid topology power converter according to an embodiment of the present application. As shown in FIG. 1, the hybrid topology power converter 1 comprises a three-level circuit module 2, a cascaded H-bridge circuit module 3 and a control device 4. The output side 21 of the three-level circuit module 2 and the input side 31 of the cascaded H-bridge circuit module 3 are connected with each other. The control device 4 is connected with the three-level circuit module 2 and the cascaded H-bridge circuit module 3. Moreover, the control device 4 is connected with an output terminal of the hybrid topology power converter 1. By injecting a zero sequence component into a total modulation wave, the control device 4 controls the operations of the switch elements of the three-level circuit module 2 and the cascaded H-bridge circuit module 3. Consequently, the ripple voltage and the ripple current of the bus capacitor of the three-level circuit module 2 and the energy loss of all power elements of the hybrid topology power converter 1 are reduced, and the power density of the hybrid topology power converter 1 is increased. In an embodiment, the output voltage Vo is a linear output voltage.

Figure 2A:
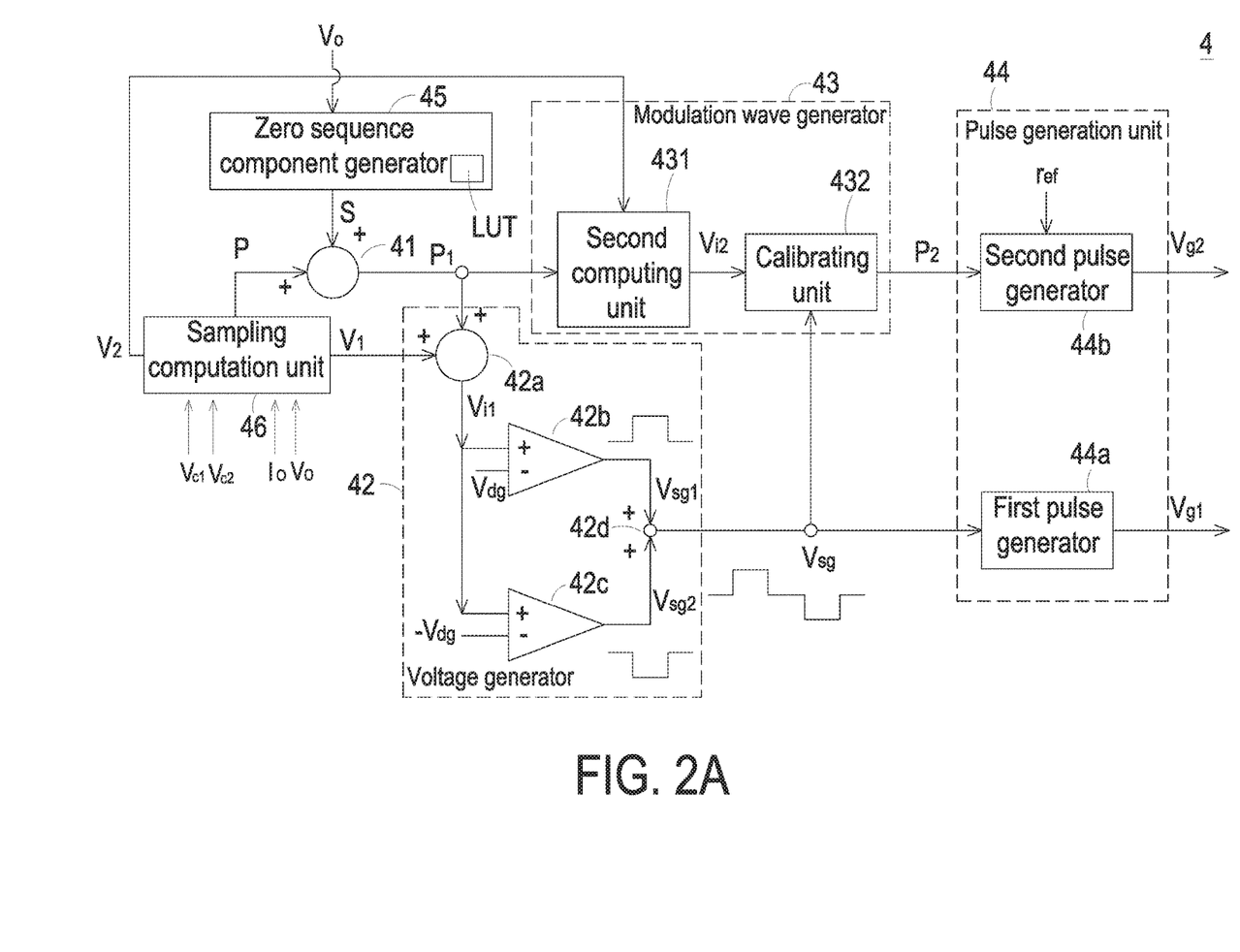
FIG. 2A is a schematic circuit diagram illustrating the detailed circuitry of an exemplary control device of the hybrid topology power converter according to the embodiment of the present application.

FIG. 2A is a schematic circuit diagram illustrating the detailed circuitry of an exemplary control device of the hybrid topology power converter according to the embodiment of the present application. As shown in FIG. 2A, the control device 4 comprises a compensated modulation wave generator 41, a voltage generator 42, a modulation wave generator 43, a pulse generation unit 44, a zero sequence component generator 45 and a sampling computation unit 46. The sampling computation unit 46 is used for sampling a bus capacitor voltage Vc1 of the three-level circuit module 2, a bus capacitor voltage Vc2 of the cascaded H-bridge circuit module 3, an output current Io of the hybrid topology power converter 1 and an output voltage Vo of the hybrid topology power converter 1. In one embodiment as shown in FIG. 1, the bus capacitor voltage Vc1 reflects a voltage of the bus capacitor Cdcmain of three-level circuit module 2, and the bus capacitor voltage Vc2 reflects a voltage of the bus capacitor Cdcaux which is one bus capacitor of the cascaded H-bridge circuit module 3. Moreover, the sampling computation unit 46 generates a first average voltage V1 corresponding to the bus capacitor voltage Vc1 of the three-level circuit module 2, a second average voltage V2 corresponding to the bus capacitor voltage Vc2 of the cascaded H-bridge circuit module 3 and a total modulation wave P corresponding to the output current Io of the hybrid topology power converter 1. The zero sequence component generator 45 generates a zero sequence component S corresponding to the output voltage Vo of the hybrid topology power converter 1. The compensated modulation wave generator 41 receives the total modulation wave P and the zero sequence component S, and injects the zero sequence component S into the total modulation wave P. Consequently, a compensated total modulation wave P1 is outputted from the compensated modulation wave generator 41. The voltage generator 42 receives the compensated total modulation wave P1 and the first average voltage V1, and generates a first voltage signal Vsg. The modulation wave generator 43 receives the first voltage signal Vsg, the compensated total modulation wave P1 and the second average voltage V2, and generates an H-bridge modulation wave P2. The pulse generation unit 44 receives the first voltage signal Vsg and the H-bridge modulation wave P2. Moreover, the pulse generation unit 44 generates a three-level driving signal Vg1 corresponding to the first voltage signal Vsg and an H-bridge driving signal Vg2 corresponding to the H-bridge modulation wave P2. Moreover, the pulse generation unit 44 adjusts the duty cycles of the switch elements of the three-level circuit module 2 according to the three-level driving signal Vg1, and adjusts the duty cycles of the switch elements of the cascaded H-bridge circuit module 3 according to the H-bridge driving signal Vg2. In one embodiment, the cascaded H-bridge circuit module 3 has plural H-bridge circuits and each H-bridge circuit has a bus capacitor voltage Vc2, so that plural H-bridge driving signals Vg2 are generated to adjust the duty cycles of the switch elements in the corresponding H-bridge circuits, in other words, each bus capacitor voltage Vc2 is controlled separately. Consequently, the action time of the large vector increases in the converting process of the three-level circuit module 2. As shown in FIG. 1, during operation of the hybrid topology power converter 1, the current flowing into a middle point 22 of the three-level circuit module 2 is reduced. Consequently, the ripple voltage and the ripple current of the bus capacitor of the three-level circuit module 2 are reduced. Moreover, since the output voltage of the three-level circuit module 2 is changed, the operation time periods of the power elements of the three-level circuit module 2 (e.g., IGBTs or diodes) are re-distributed. Under this circumstance, the energy loss of the power elements of the three-level circuit module 2 and the energy loss of the power elements of the cascaded H-bridge circuit module 3 are reduced. Since the waveform of the output voltage of the hybrid topology power converter 1 is not influenced by the zero sequence component S, the waveform of the output current Io of the hybrid topology power converter 1 is not suffered from distortion.

In this embodiment, the zero sequence component generator 45 comprises a lookup table LUT. The relationship between the output voltage Vo and the zero sequence component S of the hybrid topology power converter 1 is recorded in the lookup table LUT. For example, in case that the output voltage Vo is 0.8 p.u~1.2 p.u (i.e., 0.8 to 1.2 multiples of the reference voltage). An example of the relationship between the output voltage Vo and the zero sequence component S will be described as follows. In case that the output voltage Vo is 0.8 p.u~1.0 p.u, the zero sequence component S contains a 3-order harmonic zero sequence voltage whose amplitude is 36.5% of a fundamental amplitude of the total modulation wave and a 9-order harmonic zero sequence voltage whose amplitude is 13.1% of the fundamental amplitude. In case that the output voltage Vo is 1.0 p.u~1.2 p.u, the fraction of the zero sequence component S should be properly reduced to avoid saturation of the total modulation wave P. For example, the zero sequence component S only contains a 3-order harmonic zero sequence voltage whose amplitude is 34.67% of the fundamental amplitude. It is noted that the relationship between the output voltage Vo and the zero sequence component S is not restricted to the above example. According to the output voltage Vo of the hybrid topology power converter 1, the zero sequence component generator 45 generates the zero sequence component S through the lookup table LUT.

In another embodiment, the zero sequence component generator 45 of the control device 4 has a mathematic formula calculating unit (not shown). The zero sequence component S can be calculated according to a harmonic zero sequence voltage mathematic formula. For example, the zero sequence component S contains the 3-order harmonic zero sequence voltage and the 9-order harmonic zero sequence voltage. The 3-order harmonic zero sequence voltage mathematic formula is expressed as: $y1=k1x+b1$, and the 9-order harmonic zero sequence voltage mathematic formula is expressed as: $y2=k2x+b2$. In the above formulae, x denotes the amplitude of the output voltage, y1 denotes the amplitude of the 3-order harmonic zero sequence voltage, y2 denotes the amplitude of the 9-order harmonic zero sequence voltage, and k1, k2, b1 and b2 are constants. After the 3-order harmonic zero sequence voltage and the 9-order harmonic zero sequence voltage are obtained, the 3-order harmonic zero sequence voltage and the 9-order harmonic zero sequence voltage are superposed with each other. Consequently, the zero sequence component S is acquired. Preferably, k1 and k2 are negative.

In this embodiment, the voltage generator 42 of the control device 4 comprises a first computing unit 42$a$, a first comparator 42$b$, a second comparator 42$c$ and a superposing unit 42$d$. The first computing unit 42$a$ receives the compensated total modulation wave P1 and the first average voltage V1, and generates a first superposed voltage Vi1. The first comparator 42$b$ receives the first superposed voltage Vi1 and a first set voltage Vdg. According to the result of comparing the first superposed voltage Vi1 with the first set value Vdg, the first comparator 42$b$ generates a first comparison signal Vsg1. The second comparator 42$c$ receives the first superposed voltage Vi1 and a second set value (−Vdg). According to the result of comparing the first superposed voltage Vi1 with the second set value, the second comparator 42$c$ generates a second comparison signal Vsg2. The superposing unit 42$d$ receives the first comparison signal Vsg1 and the second comparison signal Vsg2. By superposing the first comparison signal Vsg1 with the second comparison signal Vsg2, the superposing unit 42$d$ generates the first voltage signal Vsg.

In some embodiments, the first set value and the second set value are determined according to the cascade number of the cascaded H-bridge circuit module 3 (i.e., the cascade number of cascaded H-bridge (CHB)). In some other embodiments, the first set value and the second set value are determined according to a ratio of the bus capacitor voltage Vc1 of the three-level circuit module 2 to the bus capacitor voltage Vc2 of the cascaded H-bridge circuit module 3.

The modulation wave generator 43 of the control device 4 comprises a second computing unit 431 and a calibrating unit 432. The second computing unit 431 receives the compensated total modulation wave P1 and the second average voltage V2, and generates a second superposed voltage Vi2. The calibrating unit 432 receives the second superposed voltage Vi2 and the first voltage signal Vsg, and generates the H-bridge modulation wave P2.

In some other embodiments, after the first voltage signal Vsg is subtracted from the superposed result of the compensated total modulation wave P1 and the second average voltage V2, the H-bridge modulation wave P2 is generated.

The pulse generation unit 44 of the control device 4 comprises a first pulse generator 44$a$ and a second pulse generator 44$b$. The first pulse generator 44 receives the first voltage signal Vsg, and generates the three-level driving signal Vg1. The second pulse generator 44$b$ receives the H-bridge modulation wave P2 and a reference signal ref, and generates the H-bridge driving signal Vg2. Preferably but not exclusively, the reference signal ref is a triangular wave or a sawtooth wave.

Preferably but not exclusively, the cascaded H-bridge circuit module 3 comprises at least one H-bridge circuit CHB.

Figure 2B:
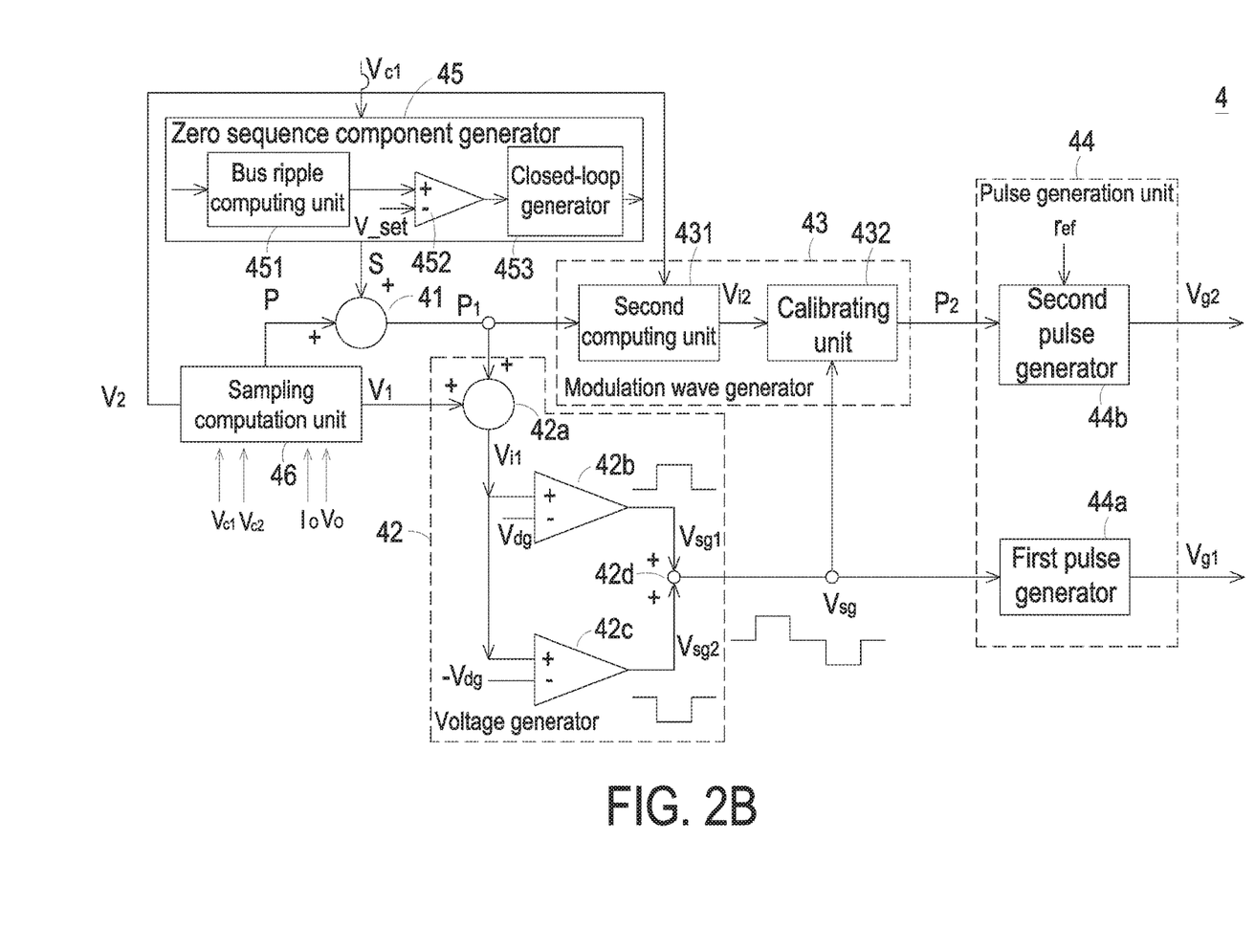
FIG. 2B is a schematic circuit diagram illustrating the detailed circuitry of another exemplary control device of the hybrid topology power converter according to the embodiment of the present application.

In some embodiments, the zero sequence component S is generated by the zero sequence component generator 45 in a closed-loop manner. FIG. 2B is a schematic circuit diagram illustrating the detailed circuitry of another exemplary control device of the hybrid topology power converter according to the embodiment of the present application. In this embodiment, the zero sequence component generator 45 comprises a bus ripple computing unit 451, a comparing unit 452 and a closed-loop generator 453. The bus ripple computing unit 451 receives the bus capacitor voltage Vc1 of the three-level circuit module 2, and calculates a ripple voltage of the bus capacitor voltage Vc1. The comparing unit 452 receives the ripple voltage of the bus capacitor voltage Vc1 and a set ripple voltage V_set. By comparing the ripple voltage of the bus capacitor voltage Vc1 with the set ripple voltage V_set, the comparing unit 452 outputs a comparison result. After the comparison result is calculated by the closed-loop generator 453, the closed-loop generator 453 outputs the zero sequence component S. For example, the zero sequence component S contains the 3-order harmonic zero sequence voltage and the 9-order harmonic zero sequence voltage. After the amplitude of the 3-order harmonic zero sequence voltage and the amplitude of the 9-order harmonic zero sequence voltage are calculated by the closed-loop generator 453, the 3-order harmonic zero sequence voltage and the 9-order harmonic zero sequence voltage are superposed with each other. Consequently, the zero sequence component S is generated. Preferably but not exclusively, the closed-loop generator 453 is a PI controller, and the PI parameters of the 3-order harmonic zero sequence component and the 9-order harmonic zero sequence component can be independent from each other.

Figure 3A:
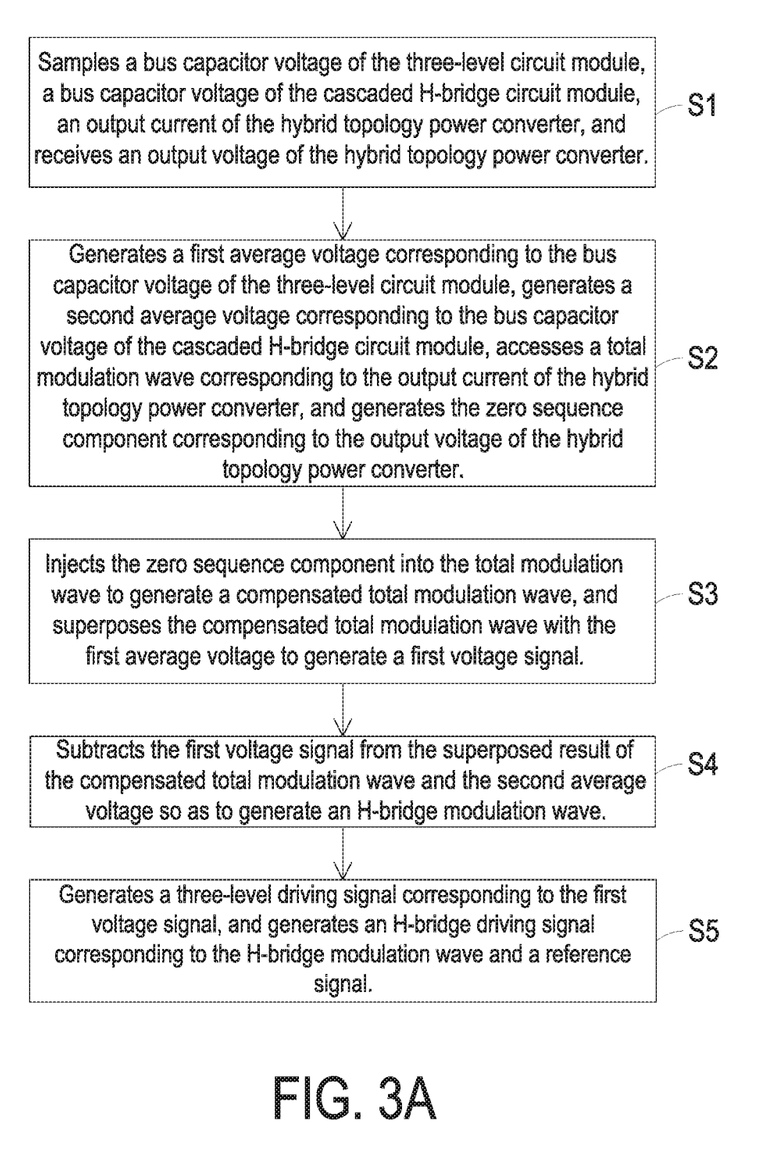
FIG. 3A is a flowchart of a control method of a hybrid topology power converter according to an embodiment of the present application.

The operations of the hybrid topology power converter 1 will be illustrated as follows. FIG. 3A is a flowchart of a control method of a hybrid topology power converter according to an embodiment of the present application. Please refer to FIGS. 1, 2 and 3A.

In a step S1, a bus capacitor voltage Vc1 of the three-level circuit module 2, a bus capacitor voltage Vc2 of the cascaded H-bridge circuit module 3, an output current Io of the hybrid topology power converter 1 and an output voltage Vo of the hybrid topology power converter 1 are sampled.

In a step S2, a first average voltage V1 corresponding to the bus capacitor voltage Vc1 of the three-level circuit module 2, a second average voltage V2 corresponding to the bus capacitor voltage Vc2 of the cascaded H-bridge circuit module 3, a total modulation wave P corresponding to the output current Io of the hybrid topology power converter 1 and a zero sequence component S corresponding to the output voltage Vo of the hybrid topology power converter 1 are generated.

In a step S3, the zero sequence component S is injected into the total modulation wave P to generate a compensated total modulation wave P1, the compensated total modulation wave P1 and the first average voltage V1 are superposed with each other to generate a first superposed voltage Vi1, a first comparison signal Vsg1 is generated according to the result of comparing the first superposed voltage Vi1 with the first set value Vdg, a second comparison signal Vsg2 is generated according to the result of comparing the first superposed voltage Vi1 with the second set value, and the first comparison signal Vsg1 and the second comparison signal Vsg2 are superposed with each other to generates a first voltage signal Vsg.

In a step S4, the first voltage signal Vsg is subtracted from the superposed result of the compensated total modulation wave P1 and the second average voltage V2, and thus an H-bridge modulation wave P2 is generated.

In a step S5, a three-level driving signal Vg1 corresponding to the first voltage signal Vsg and an H-bridge driving signal Vg2 corresponding to the H-bridge modulation wave P2 and a reference signal ref are generated. Moreover, the pulse generation unit 44 adjusts the duty cycles of the switch elements of the three-level circuit module 2 according to the three-level driving signal Vg1, and adjusts the duty cycles of the switch elements of the cascaded H-bridge circuit module 3 according to the H-bridge driving signal Vg2.

Moreover, in the step S2, the zero sequence component S corresponding to the output voltage Vo of the hybrid topology power converter 1 is generated according to a lookup table LUT. The relationship between the output voltage Vo and the zero sequence component S is recorded in the lookup table LUT. Alternatively, the zero sequence component S is calculated according to a harmonic zero sequence voltage mathematic formula. For example, the harmonic zero sequence voltage mathematic formula is expressed as: y=kx+b. In this formula, x denotes the amplitude of the output voltage, y denotes the amplitude of the harmonic zero sequence voltage, and k and b are constants.

Figure 3B:
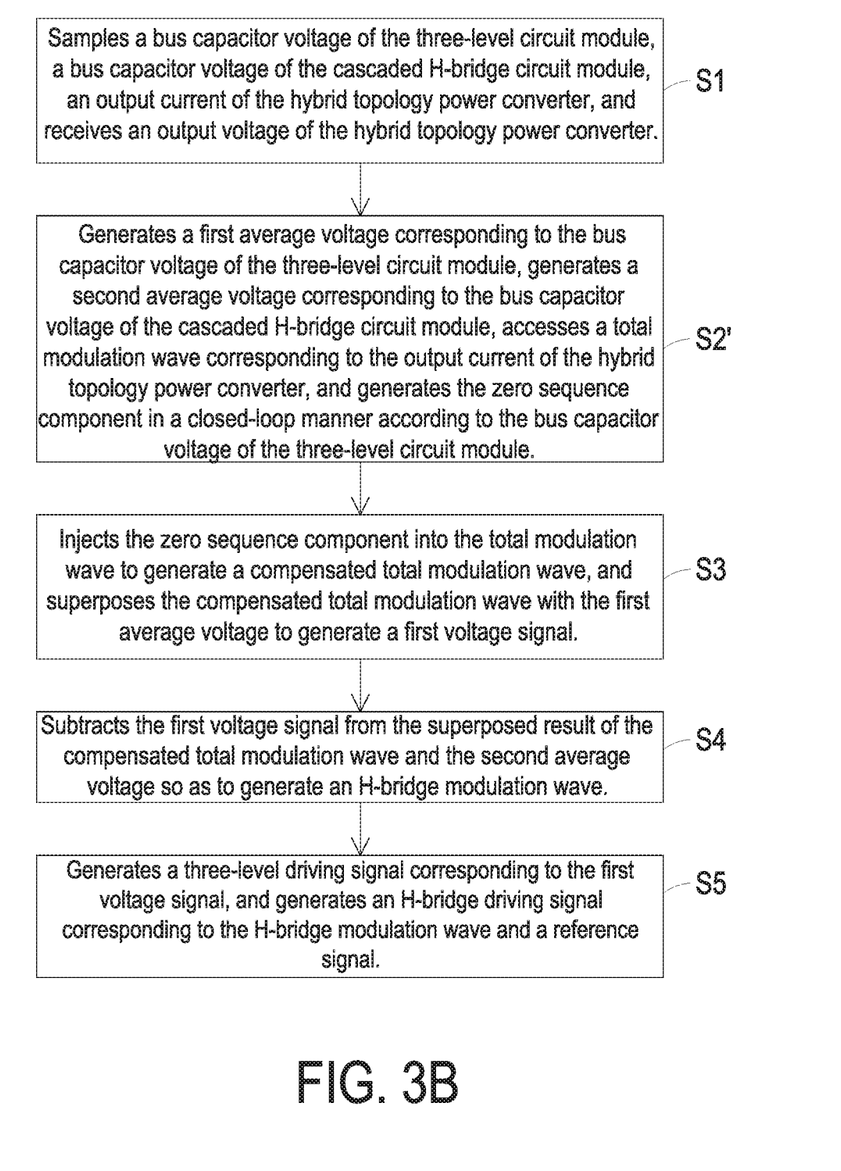
FIG. 3B is a flowchart of a control method of a hybrid topology power converter according to another embodiment of the present application.

FIG. 3B is a flowchart of a control method of a hybrid topology power converter according to another embodiment of the present application. Please refer to FIGS. 1, 2 and 3B. Component parts and steps corresponding to those of the above embodiment are designated by identical numeral references, and detailed descriptions thereof are omitted. The step S2' of this embodiment is distinguished from the step S2 of the above embodiment. In the step S2', a first average voltage V1 corresponding to the bus capacitor voltage Vc1 of the three-level circuit module 2, a second average voltage V2 corresponding to the bus capacitor voltage Vc2 of the cascaded H-bridge circuit module 3, a total modulation wave P corresponding to the output current Io of the hybrid topology power converter 1 are generated, and a zero sequence component S is generated in a closed-loop manner according to the bus capacitor voltage Vc1 of the three-level circuit module 2.

The step S2' of generating the zero sequence component S in the closed-loop manner further comprises the following sub-steps. Firstly, a ripple voltage of the bus capacitor voltage Vc1 is calculated. Then, by comparing the ripple voltage of the bus capacitor voltage Vc1 with a set ripple voltage V_set, a comparison result is outputted. Then, the zero sequence component S is generated according to the comparison result. Particularly, these sub-steps are performed by the zero sequence component generator 45 of FIG. 2B. The operations of the zero sequence component generator 45 have been mentioned as above. It is noted that the sequence of steps of the control method as shown in FIG. 3A or FIG. 3B is not restricted.

Figure 4A:
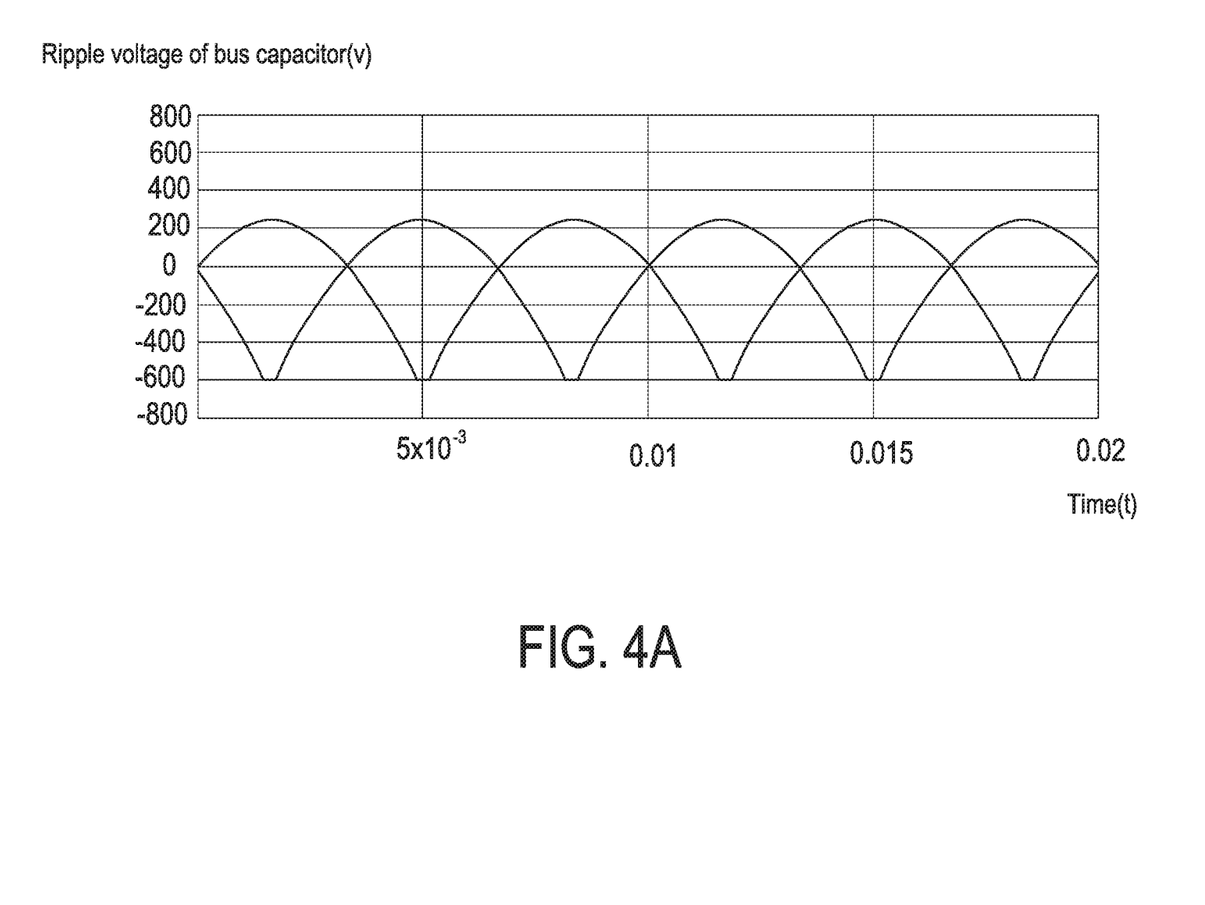
FIG. 4A is a schematic timing diagram illustrating the bus capacitor ripple voltage of the three-level circuit module when the output voltage of the hybrid topology power converter is 1.0 p.u and no zero sequence component is injected.
Figure 4B:
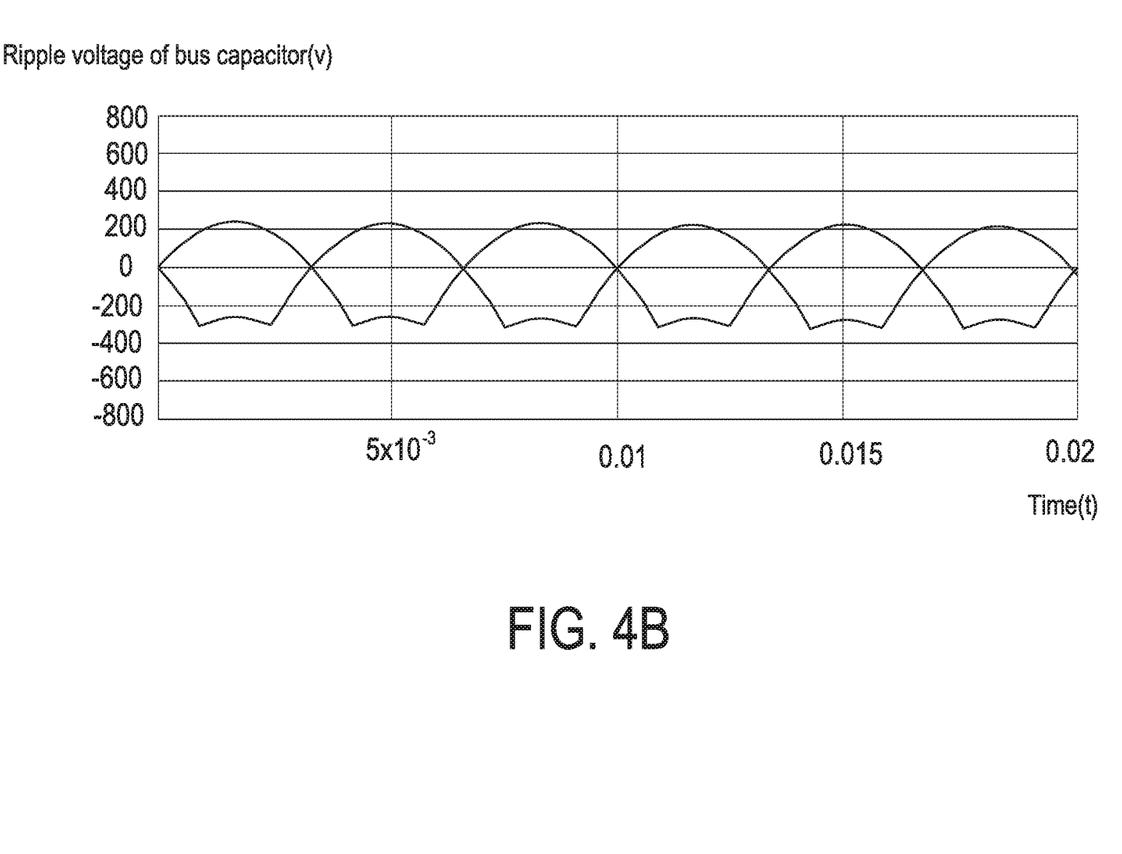
FIG. 4B is a schematic timing diagram illustrating the bus capacitor ripple voltage of the three-level circuit module when the output voltage of the hybrid topology power converter is 1.0 p.u and the zero sequence component is injected.
Figure 4C:
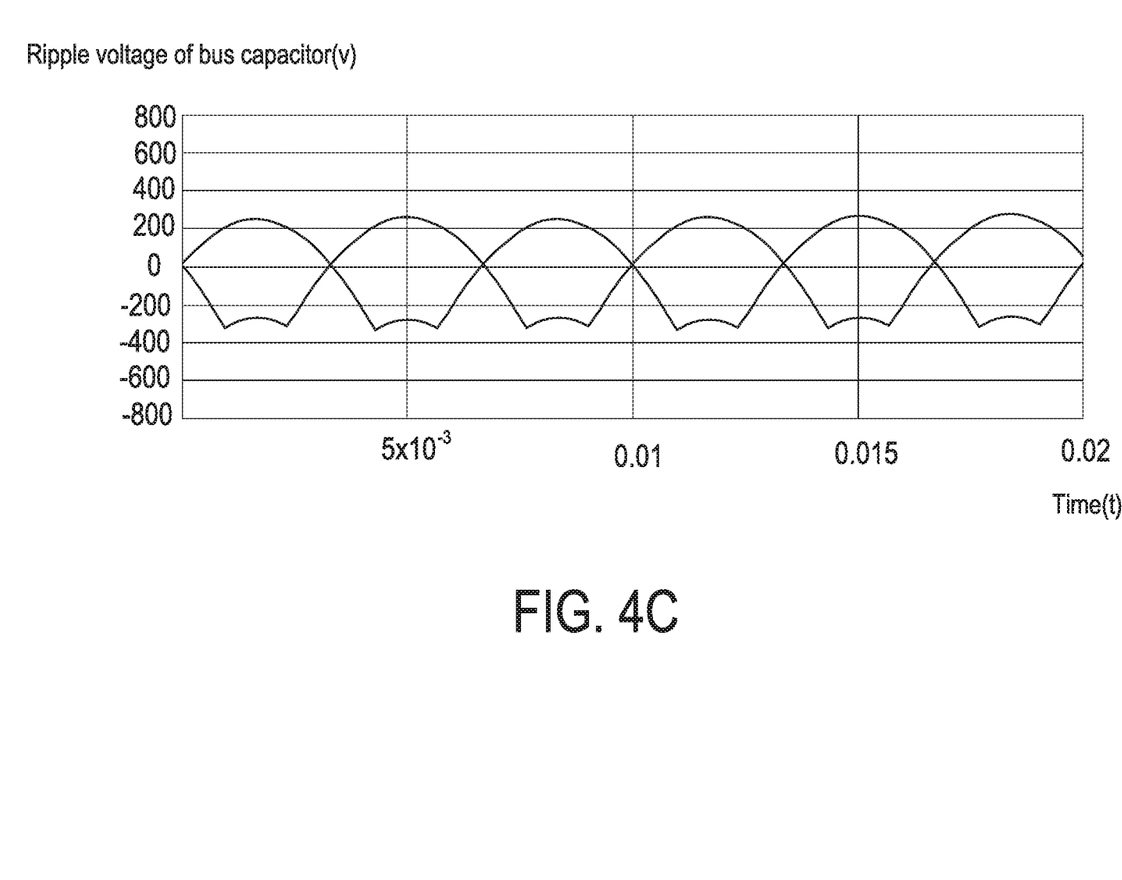
FIG. 4C is a schematic timing diagram illustrating the bus capacitor ripple voltage of the three-level circuit module when the output voltage of the hybrid topology power converter is 0.8 p.u and the zero sequence component is injected.
Figure 4D:
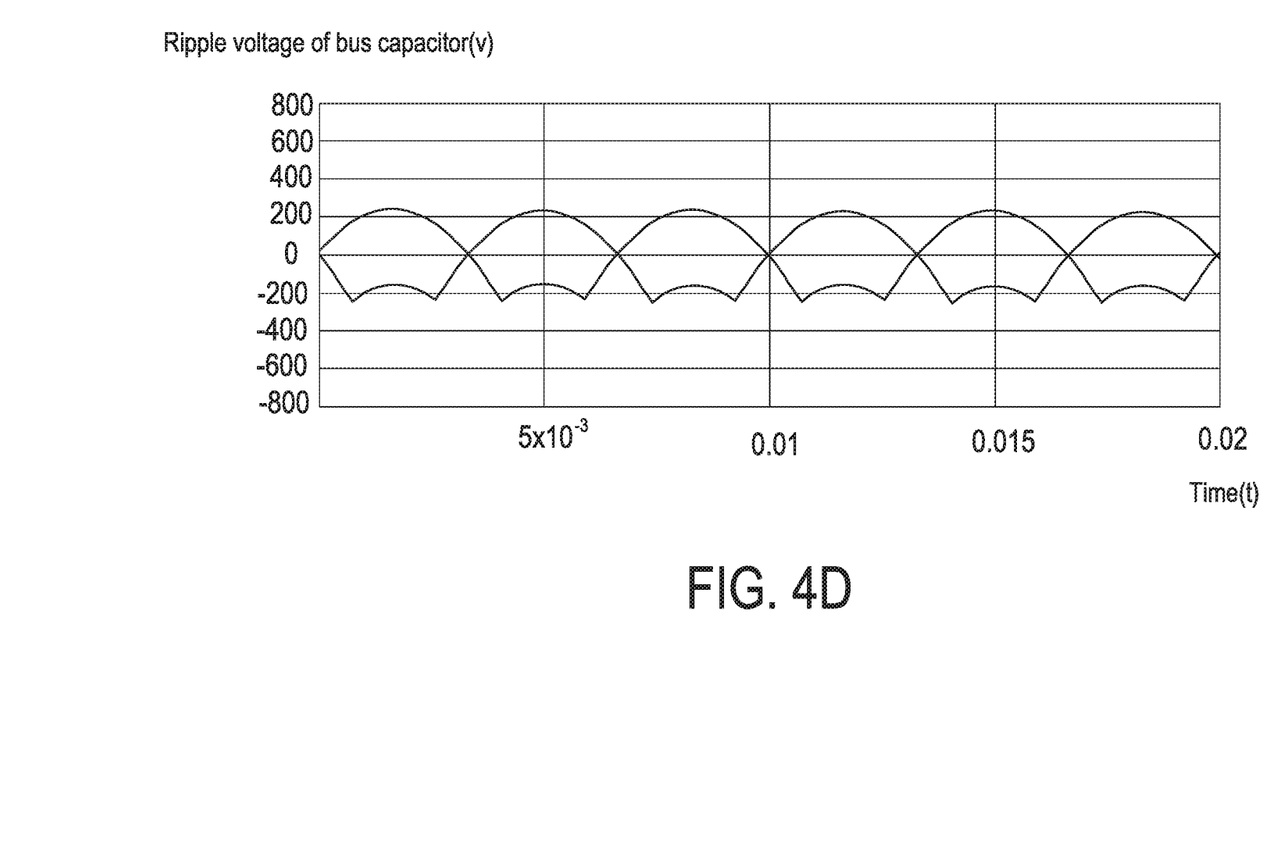
FIG. 4D is a schematic timing diagram illustrating the bus capacitor ripple voltage of the three-level circuit module when the output voltage of the hybrid topology power converter is 0.8 p.u and the optimized zero sequence component is injected.

After the zero sequence component S is injected into the hybrid topology power converter 1, the efficacy can be indicated from FIGS. 4A~4D. In these diagrams, as an example, the hybrid topology power converter 1 is a hybrid topology SVG at 10 kV 2 MVar. FIG. 4A is a schematic timing diagram illustrating the bus capacitor ripple voltage of the three-level circuit module when the output voltage of the hybrid topology power converter is 1.0 p.u and no zero sequence component is injected. FIG. 4B is a schematic timing diagram illustrating the bus capacitor ripple voltage of the three-level circuit module when the output voltage of the hybrid topology power converter is 1.0 p.u and the zero sequence component is injected. FIG. 4C is a schematic timing diagram illustrating the bus capacitor ripple voltage of the three-level circuit module when the output voltage of the hybrid topology power converter is 0.8 p.u and the zero sequence component is injected. FIG. 4D is a schematic timing diagram illustrating the bus capacitor ripple voltage of the three-level circuit module when the output voltage of the hybrid topology power converter is 0.8 p.u and the optimized zero sequence component is injected.

From the comparisons between the result of FIG. 4A~FIG. 4D, it is found that the ripper voltages of the upper and lower bus capacitors Cdcmain (see FIG. 1) of the three-level circuit module 2 are reduced after the zero sequence component is injected.

When the output voltage of the hybrid topology power converter is 1.0 p.u and no zero sequence component is injected, as shown in FIG. 4A, the bus capacitor ripple voltage of the three-level circuit module 2 is 5.7%. And other parameters not shown in FIG. 4A, for example, are as follows: the bus capacitor ripple current of the three-level circuit module 2 is 85.44 A, and the energy loss of the power elements of the three-level circuit module 2 is 17.52 kW. When the output voltage of the hybrid topology power converter is 1.0 p.u and the zero sequence component (e.g., a 3-order harmonic zero sequence voltage whose amplitude is 25% of the fundamental amplitude) is injected, as shown in FIG. 4B, the bus capacitor ripple voltage of the three-level circuit module 2 is 3.66%. And other parameters not shown in FIG. 4B, for example, are as follows: the bus capacitor ripple current of the three-level circuit module 2 is 62.92 A, and the energy loss of the power elements of the three-level circuit module 2 is 16.94 kW. Consequently, after the zero sequence component S is injected, the reduction of the bus capacitor ripple voltage of the three-level circuit module 2 is 42.31%, the reduction of the bus capacitor ripple current of the three-level circuit module 2 is 30.7%, and the power reduction of the power elements of the three-level circuit module 2 is 8.7%.

Assuming that the output voltage Vo of the hybrid topology power converter 1 is changed in a predetermined range, the injected zero sequence component S can be adjusted according to the output voltage Vo. Consequently, the reductions of the bus capacitor ripple voltage and the bus capacitor ripple current and the energy loss reduction of the power elements are optimized. When the output voltage of the hybrid topology power converter is 0.80 p.u and the zero sequence component (e.g., the 3-order harmonic zero sequence voltage whose amplitude is 34.67% of the fundamental amplitude) is injected, as shown in FIG. 4C, the bus capacitor ripple voltage of the three-level circuit module 2 is 3.88%. And other parameters not shown in FIG. 4C, for example, are as follows: the bus capacitor ripple current of the three-level circuit module 2 is 65.27 A, and the energy loss of the power elements of the three-level circuit module 2 is 17.11 kW. When the output voltage of the hybrid topology power converter is 0.80 p.u and the zero sequence component (e.g., a 3-order harmonic zero sequence voltage whose amplitude is 36.5% of the fundamental amplitude and a 9-order harmonic zero sequence voltage whose amplitude is 13.1% of the fundamental amplitude) is injected, as shown in FIG. 4D, the bus capacitor ripple voltage of the three-level circuit module 2 is 3.24%. And other parameters not shown in FIG. 4D, for example, are as follows: the bus capacitor ripple current of the three-level circuit module 2 is 58.48 A, and the energy loss of the power elements of the three-level circuit module 2 is 16.17 kW. In comparison with the result of FIG. 4C, the performance of FIG. 4D is described as follows. After the fraction of the zero sequence component S is changed, the reduction of the bus capacitor ripple voltage of the three-level circuit module 2 is 16.5%, the reduction of the bus capacitor ripple current of the three-level circuit module 2 is 10.4%, and the power reduction of the power elements of the three-level circuit module 2 is 5.5%.

In other words, by changing the fraction of the zero sequence component S, the reductions of the bus capacitor ripple voltage and the bus capacitor ripple current and the energy loss reduction of the power elements are optimized.

From the above descriptions, the present application provides the hybrid topology power converter and the control method of the hybrid topology power converter. The zero sequence component is injected into the total modulation wave. Consequently, the ripple voltage and the ripple current of the bus capacitor of the three-level circuit module and the energy loss of all power elements of the hybrid topology power converter are reduced, and the power density of the hybrid topology power converter is increased. The performance of the hybrid topology power converter is still satisfied. Moreover, since the capacitance of the bus capacitor and the number of capacitors are not increased, the overall volume and the fabricating cost of the hybrid topology power converter are not increased.

While the application has been described in terms of what is presently considered to be the most practical and preferred embodiments, it is to be understood that the application needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control method of a hybrid topology power converter, the hybrid topology power converter comprising a three-level circuit module and a cascaded H-bridge circuit module, an output side of the three-level circuit module being connected with an input side of the cascaded H-bridge circuit module, the control method comprising steps of:
   injecting a zero sequence component into a total modulation wave, thereby generating a compensated total modulation wave;
   generating a first voltage signal according to the compensated total modulation wave;
   generating an H-bridge modulation wave according to the compensated total modulation wave and the first voltage signal; and
   generating a three-level driving signal according to the first voltage signal, and generating an H-bridge driving signal according to the H-bridge modulation wave,
   wherein a duty cycle of at least one switch element of the three-level circuit module is adjusted according to the three-level driving signal, and a duty cycle of at least one switch elements of the cascaded H-bridge circuit module is adjusted according to the H-bridge driving signal.

2. The control method according to claim 1, further comprising a step of generating the zero sequence component according to an output voltage of the hybrid topology power converter.

3. The control method according to claim 2, further comprising a step of obtaining the zero sequence component according to a lookup table, wherein a relationship between the output voltage and the zero sequence component is recorded in the lookup table.

4. The control method according to claim 2, further comprising a step of obtaining the zero sequence component according to a harmonic zero sequence voltage mathematic formula, wherein a relationship between the output voltage and the zero sequence component is recorded in the harmonic zero sequence voltage mathematic formula.

5. The control method according to claim 1, wherein the zero sequence component is obtained in a closed-loop manner according to a bus capacitor voltage of the three-level circuit module, wherein a bus capacitor ripple voltage is calculated according to the bus capacitor voltage of the three-level circuit module, and the zero sequence component is generated according to a result of comparing the bus capacitor ripple voltage with a set ripple voltage.

6. The control method according to claim 1, wherein the step of generating the first voltage signal further comprises sub-steps of:
   generating a first average voltage according to a bus capacitor voltage of the three-level circuit module;
   superposing the first average voltage with the compensated total modulation wave, thereby generating a first superposed voltage;
   generating a first comparison signal according to a result of comparing the first superposed voltage with a first set value;
   generating a second comparison signal according to a result of comparing the first superposed voltage with a second set value; and
   superposing the first comparison signal with the second comparison signal, thereby generating the first voltage signal.

7. The control method according to claim 6, wherein the first set value and the second set value are determined according to a cascade number of the cascaded H-bridge circuit module, and/or the first set value and the second set value are determined according to a ratio of the bus capacitor voltage of the three-level circuit module to a bus capacitor voltage of the cascaded H-bridge circuit module.

8. The control method according to claim 1, wherein the step of generating the H-bridge modulation wave further comprises sub-steps of:
   generating a second average voltage according to a bus capacitor voltage of the cascaded H-bridge circuit module;

superposing the second average voltage with the compensated total modulation wave, thereby generating a superposed result; and subtracting the first voltage signal from the superposed result, thereby generating the H-bridge modulation wave.

9. The control method according to claim 1, wherein the H-bridge driving signal is generated according to a result of comparing the H-bridge modulation wave with a reference signal.

10. The control method according to claim 1, further comprising a step of generating the total modulation wave according to an output current of the hybrid topology power converter.

11. A hybrid topology power converter, comprising:
a three-level circuit module;
a cascaded H-bridge circuit module, wherein an output side of the three-level circuit module is coupled with an input side of the cascaded H-bridge circuit module; and
a control device comprising:
 a compensated modulation wave generator receiving a total modulation wave and a zero sequence component and injecting the zero sequence component into the total modulation wave, thereby generating a compensated total modulation wave;
 a voltage generator receiving the compensated total modulation wave, and generating a first voltage signal;
 a modulation wave generator receiving the first voltage signal and the compensated total modulation wave, thereby generating an H-bridge modulation wave; and
 a pulse generation unit receiving the first voltage signal and the H-bridge modulation wave, and generating a three-level driving signal corresponding to the first voltage signal and an H-bridge driving signal corresponding to the H-bridge modulation wave,
 wherein the pulse generation unit adjusts a duty cycle of at least one switch element of the three-level circuit module according to the three-level driving signal, and adjusts a duty cycle of at least one switch elements of the cascaded H-bridge circuit module according to the H-bridge driving signal.

12. The hybrid topology power converter according to claim 11, wherein the control device further comprises a zero sequence component generator, wherein the zero sequence component generator generates the zero sequence component according to an output voltage of the hybrid topology power converter.

13. The hybrid topology power converter according to claim 12, wherein the zero sequence component generator obtains the zero sequence component according to a lookup table, and a relationship between the output voltage and the zero sequence component is recorded in the lookup table.

14. The hybrid topology power converter according to claim 12, wherein the zero sequence component generator obtains the zero sequence component according to a harmonic zero sequence voltage mathematic formula, wherein a relationship between the output voltage and the zero sequence component is recorded in the harmonic zero sequence voltage mathematic formula.

15. The hybrid topology power converter according to claim 11, wherein the control unit further comprises:
 a bus ripple computing unit receiving a bus capacitor voltage of the three-level circuit module, and calculating a ripple voltage of the bus capacitor voltage;
 a comparing unit receiving a ripple voltage of the bus capacitor voltage and a set ripple voltage, wherein by comparing the ripple voltage of the bus capacitor voltage with the set ripple voltage, the comparing unit outputs a comparison result; and
 a closed-loop generator generating the zero sequence component according to the comparison result.

16. The hybrid topology power converter according to claim 15, wherein the closed-loop generator is a PI controller.

17. The hybrid topology power converter according to claim 11, wherein the voltage generator comprises:
 a first computing unit receiving the compensated total modulation wave and a first average voltage, thereby generating a first superposed voltage;
 a first comparator receiving the first superposed voltage and a first set voltage, and generating a first comparison signal according to a result of comparing the first superposed voltage with the first set value;
 a second comparator receiving the first superposed voltage and a second set value, and generating a second comparison signal according to a result of comparing the first superposed voltage with the second set value; and
 a superposing unit for superposing the first comparison signal with the second comparison signal, thereby generating the first voltage signal, wherein the first average voltage is generated according to a bus capacitor voltage of the three-level circuit module.

18. The hybrid topology power converter according to claim 11, wherein the modulation wave generator comprises:
 a second computing unit receiving the compensated total modulation wave and a second average voltage, and generating a second superposed voltage; and
 a calibrating unit receiving the second superposed voltage and the first voltage signal, and generating the H-bridge modulation wave,
 wherein the second average voltage is generated according to a bus capacitor voltage of the cascaded H-bridge circuit module.

19. The hybrid topology power converter according to claim 11, wherein the pulse generation unit comprises:
 a first pulse generator receiving the first voltage signal, and generating the three-level driving signal; and
 a second pulse generator receiving the H-bridge modulation wave and a reference signal, and generating the H-bridge driving signal.

20. The hybrid topology power converter according to claim 11, wherein the cascaded H-bridge circuit module comprises at least one H-bridge circuit.

* * * * *